(12) United States Patent  
Leleannec et al.

(10) Patent No.: US 12,301,818 B2  
(45) Date of Patent: May 13, 2025

(54) CONTEXT-BASED BINARY ARITHMETIC ENCODING AND DECODING

(71) Applicant: InterDigital VC Holdings, Inc., Wilmington, DE (US)

(72) Inventors: Fabrice Leleannec, Mouaze (FR); Tangi Poirier, Thorigne-Fouillard (FR); Ya Chen, Rennes (FR); Edouard Francois, Bourg des Comptes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/255,746

(22) PCT Filed: May 30, 2019

(86) PCT No.: PCT/US2019/034498  
§ 371 (c)(1),  
(2) Date: Dec. 23, 2020

(87) PCT Pub. No.: WO2020/009758  
PCT Pub. Date: Jan. 9, 2020

(65) Prior Publication Data  
US 2021/0274182 A1    Sep. 2, 2021

(30) Foreign Application Priority Data  
Jul. 2, 2018 (EP) .................................. 18305854

(51) Int. Cl.  
H04N 19/13 (2014.01)  
H04N 19/103 (2014.01)  
(Continued)

(52) U.S. Cl.  
CPC ........... H04N 19/13 (2014.11); H04N 19/103 (2014.11); H04N 19/119 (2014.11);  
(Continued)

(58) Field of Classification Search  
CPC ...... H04N 19/13; H04N 19/44; H04N 19/103; H04N 19/157; H04N 19/119; H04N 19/25  
See application file for complete search history.

(56) References Cited

U.S. PATENT DOCUMENTS

2006/0232452 A1* 10/2006 Cha ..................... H04N 19/174  
341/50  
2008/0123736 A1* 5/2008 Sekiguchi ............ H04N 19/436  
375/240.01  
(Continued)

FOREIGN PATENT DOCUMENTS

CA 2147164 A1 4/1994  
CN 103931188 A 7/2014  
(Continued)

OTHER PUBLICATIONS

Chen et al., "Algorithm Description for Versatile Video Coding and Test Model 1 (VTM 1)", Joint Video Experts Team (JVET) of ITU-T SG 16 WP 3 and ISO/IEC JTC 1/SC 29/WG 11, Document JVET-J1002-v1, 10th Meeting: San Diego, California, United States, Apr. 10, 2018, 7 pages.

(Continued)

*Primary Examiner* — Shawn S An  
(74) *Attorney, Agent, or Firm* — Condo Roccia Koptiw LLP

(57) ABSTRACT

An encoding method is disclosed. At least one context is first determined for encoding a syntax element associated with a block of a picture responsive to a current quantization parameter associated with the block. Second, the syntax element is context-based entropy encoded with the at least one determined context.

15 Claims, 9 Drawing Sheets

(51) Int. Cl.
  *H04N 19/119* (2014.01)
  *H04N 19/157* (2014.01)
  *H04N 19/25* (2014.01)
  *H04N 19/44* (2014.01)
(52) U.S. Cl.
  CPC .......... *H04N 19/157* (2014.11); *H04N 19/25* (2014.11); *H04N 19/44* (2014.11)

(56) References Cited

U.S. PATENT DOCUMENTS

| | | | |
|---|---|---|---|
| 2009/0058695 A1* | 3/2009 | Bao | H03M 7/4006 341/51 |
| 2011/0096829 A1 | 4/2011 | Han et al. | |
| 2012/0099646 A1* | 4/2012 | Coban | H04N 19/176 375/240.18 |
| 2013/0003835 A1* | 1/2013 | Sole Rojals | H04N 19/129 375/240.18 |
| 2013/0114676 A1* | 5/2013 | Guo | H03M 7/4018 375/240.02 |
| 2013/0177069 A1 | 7/2013 | Sze et al. | |
| 2013/0195199 A1* | 8/2013 | Guo | H04N 19/91 375/240.18 |
| 2013/0336388 A1* | 12/2013 | Terada | H04N 19/90 375/240.03 |
| 2014/0198841 A1 | 7/2014 | George et al. | |
| 2014/0328396 A1 | 11/2014 | Guo et al. | |
| 2015/0189321 A1* | 7/2015 | Chen | H04N 19/597 375/240.02 |
| 2015/0334425 A1* | 11/2015 | He | H04N 19/174 375/240.03 |
| 2016/0100179 A1* | 4/2016 | He | H04N 19/91 375/240.25 |
| 2016/0227239 A1* | 8/2016 | Pu | H04N 19/593 |
| 2016/0286215 A1* | 9/2016 | Gamei | H04N 19/129 |
| 2016/0353113 A1* | 12/2016 | Zhang | H04N 19/625 |
| 2017/0064336 A1 | 3/2017 | Zhang et al. | |
| 2017/0094274 A1* | 3/2017 | Chien | H04N 19/159 |
| 2017/0142416 A1 | 5/2017 | Valeri et al. | |
| 2017/0214931 A1* | 7/2017 | Sasai | H04N 19/61 |
| 2018/0160118 A1* | 6/2018 | Tsukuba | H04N 19/119 |
| 2019/0158837 A1* | 5/2019 | Zhang | H04N 19/187 |
| 2019/0253624 A1* | 8/2019 | Kim | H04N 19/103 |
| 2020/0267412 A1* | 8/2020 | Karczewicz | H04N 19/70 |
| 2020/0404328 A1* | 12/2020 | Auyeung | H04N 19/91 |
| 2021/0274182 A1* | 9/2021 | Leleannec | H04N 19/176 |

FOREIGN PATENT DOCUMENTS

| | | |
|---|---|---|
| CN | 104038767 A | 9/2014 |
| CN | 107333141 A | 11/2017 |
| CN | 107580224 A | 1/2018 |
| IN | 201747037578 | 10/2017 |
| JP | 2007300455 A | 11/2007 |
| WO | 2011128303 A2 | 10/2011 |
| WO | 2016196287 A1 | 12/2016 |

OTHER PUBLICATIONS

Bross, B., "Versatile Video Coding (Draft 1)", Joint Video Experts Team (JVET) of ITU-T SG 16 WP 3 and ISO/IEC JTC 1/SC 29/WG 11, Document: JVET-J1001-v2, 10th Meeting: San Diego, California, United States, Apr. 10, 2018, 40 pages.

Chen et al., "Algorithm Description of Joint Exploration Test Model 7 (JEM 7)", Joint Video Exploration Team (JVET) of ITU-T SG 16 WP3 and ISO/IEC JTC 1/SC 29/WG 11, Document: JVET-G1001-v1, 7th Meeting, Torino, Italy, Jul. 13, 2017, 50 pages.

Anonymous, "High Efficiency Video Coding", ITU-T Telecommunication Standardization Sector of ITU, Series H: Audiovisual and Multimedia Systems Infrastructure of Audiovisual Services—Coding of Moving Video, Recommendation ITU-T H.265, Oct. 2014, 540 pages.

CN 107580224, Cited in related Japanese application No. 201980044062.3 in notice of allowance dated Aug. 20, 2024.

CN 104038767, Cited in related Japanese application No. 201980044062.3 in notice of allowance dated Aug. 20, 2024.

CN 2007300455, Cited in related Japanese application No. 201980044062.3 in notice of allowance dated Aug. 20, 2024.

* cited by examiner

CONTEXT-BASED BINARY ARITHMETIC ENCODING AND DECODING

CROSS REFERENCE TO RELATED APPLICATIONS

This application is the national stage entry under 35 U.S.C. § 371 of International Application PCT/US2019/034498, filed May 30, 2019 which was published in accordance with PCT Article 21(2) on Jan. 9, 2020, in English, and which claims the benefit of European Patent Application No. 18305854.4, filed Jul. 2, 2018.

1. TECHNICAL FIELD

The present embodiments generally relate to a method and an apparatus for video encoding or decoding, and more particularly, to a method and an apparatus for video encoding or decoding using adaptive quantization.

2. BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding.

3. BRIEF SUMMARY

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

4. BRIEF SUMMARY OF THE DRAWINGS

5. DETAILED DESCRIPTION

Figure 1:
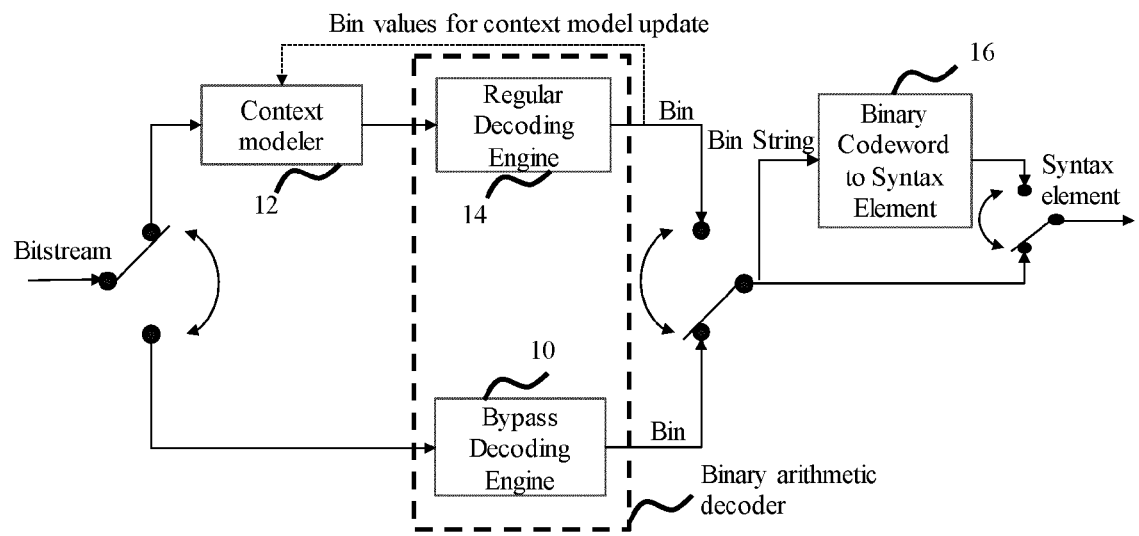
FIG. 1 depicts a CABAC (Context Adaptive Binary Arithmetic Coding) decoding process of a syntax element given an input coded bitstream.

Adaptive (or variable) quantization is widely used to optimize the visual quality of the decoded video, at a given bitrate. As an example, variable quantization parameter (QP) can be employed within a same slice. Typically, perceptually optimizing the encoding is obtained by allocating more bits to picture regions that are perceptually sensitive.

At least one embodiment proposes to improve the compression efficiency of a video encoding system, under the assumption that multiple QPs are used to encode one picture.

In the traditional standard video compression schemes, the entropy encoding of some bitstream syntax elements employs the known Context Adaptive Binary Arithmetic Coding (CABAC).

This comprises representing each syntax element (or symbol) to encode under the form of a series of binary symbols called 'bins'. Each bin may be arithmetically coded. The probabilities that the bin is equal to 1 or 0 are conditional probabilities, which depend on some contextual state/information the considered bin is correlated with.

These conditional probabilities define a so-called context model that represents the statistical behavior of the random variable corresponding to the considered binary symbol. The context used to encode/decode the considered bin may be adaptively chosen according to the contextual state of the codec when processing the considered bin.

Thus, to select the context appropriate to encode/decode the considered bin, a context index is computed, and then used to identify the context used for the encoding/decoding.

Typically, the context index may depend on values taken by the considered symbol, for some surrounding (top, left) already coded blocks.

As long as the 'bin' is being encoded, e.g. for successive blocks in the picture, the concerned context model, i.e. the conditional probabilities associated with the context, is being updated as a function of the value successively taken by the bin.

The update of the context probabilities considers a single or double sliding window, respectively in HEVC and in the JEM (Joint Exploration Model, "Algorithm description of Joint Exploration Test Model 7 (JEM7)", J. Chen, E. Alshina, G. J. Sullivan, J.-R. Ohm, J. Boyce (editors), JVET-G1001, August 2017). It aims at progressively making the conditional probabilities match the statistical behavior of the considered bin, with an accuracy as fine as possible. The context model updating process has also a given inertia, i.e. the probabilities progressively converge towards the precise statistical mode of the bin, with a certain speed.

However, the statistical behavior of some syntax elements significantly varies from a QP to another. This is typically the case of bins used to signal some splits modes, or some transform coefficients/blocks significance information. Indeed, this kind of information strongly depends on the codec operating point in terms of rate level. As a matter of fact, in the case where the QP takes multiple values inside a same coded slice, the statistical behavior of some syntax elements may change, and their associated contexts may be updated as a function of these statistical model changes resulting from multiple QP values.

The context model updating system has a certain level of inertia, several events for the concerned 'bin' are needed to make the model converge towards an accurate modelling. Therefore, the CABAC encoding efficiency may suffer from switching between multiple QP in a same coded slice, in terms of accuracy of the statistical behavior model of some coded/decoded syntax elements.

At least one embodiment makes the CABAC encoding/decoding system more efficient in the case of multiple QP changes inside a single coded slice.

Usually, the context model is made of two conditional probabilities of the bin being 1 or 0, given some past events. Each time a bin is decoded, the concerned context model is updated according to a multi-hypothesis system.

The context model probability updating process has a certain speed, in terms of convergence towards an accurate modelling. This speed is adjusted to optimize the encoding efficiency, by slice type and slice-level quantization parameter (QP). However, the context probability updating process does not consider the possibility that the QP may vary from block to block inside a given slice. In addition, generally the same context is used for all QP values, for a given binary symbol of the coded video syntax.

Thus, the CABAC arithmetic encoding engine and the context management are not optimized for a situation where the QP varies from block to block inside a same coded slice.

At least one embodiment makes the CABAC encoding/decoding system more efficient in the case of multiple QP changes from block to block inside a single coded slice.

The following sections describe several implementations. First, encoding/decoding of various syntax elements are described. Then, various implementations of a first embodiment of entropy encoding/decoding of syntax elements used in residual encoding/decoding are described. Then, different implementations of a second embodiment of entropy encoding/decoding of syntax elements used in encoding/decoding of split information are described. Various implementations of a third embodiment for updating probabilities in context-based entropy encoding are described. Finally, at least one embodiment is described that uses bypass encoding. At least one embodiment uses multiple possible context models for some syntax elements, and switch from a context set to another one according to the QP change that happen during the encoding/decoding of a slice.

Context-Adaptive Binary Arithmetic Encoding (CABAC) and Decoding

FIG. 1 depicts the CABAC decoding process of a syntax element given the input coded bitstream.

One input to the process of FIG. 1 is the coded bitstream, e.g. conforming to the HEVC specification, and extensions thereof or future video encoding standards. At any point of the decoding process, the decoder knowns which syntax element is to be decoded next. This is fully specified in the standardized bitstream syntax and decoding process. Moreover, it also knows how the current syntax element to decode is binarized (i.e. represented as a sequence of binary symbols called bins, each equal to '1' or '0'), and how each bin of the bin string has been encoded.

Therefore, the first stage of the CABAC decoding process (left side of FIG. 1) decodes a series of bins. For each bin, it knows if it has been encoded according to the bypass mode or the regular mode. The bypass mode simply comprises reading a bit in the bitstream and assigning the obtained bit value to the current bin. This mode has the advantage of being straightforward, hence fast. The bypass decoding engine (10) of FIG. 1 performs the decoding in bypass mode. It is typically used for bins that have a uniform statistical distribution, i.e. equal probability of being equal to '1' or '0'.

On the opposite, if the current bin has not been coded in bypass mode, then it means it has been coded in so-called regular mode, i.e. through context-based arithmetic encoding.

In that case, the decoding of the considered bin proceeds as follows. First, a context is obtained for the decoding of the current bin. It is given by the context modeler module (12) shown on FIG. 1. The goal of the context is to obtain the conditional probability that the current bin has value '0', given some contextual prior information X. The prior information X is usually the value of some already decoded syntax element, available both on the encoder and decoder side in a synchronous way at the time the current bin is being decoded.

Typically, the prior information X used for decoding a bin is specified in the standard in such a way that it is statistically correlated with the current bin to decode. The interest of using this contextual information is that it reduces the rate cost of encoding the bin. The fact that the bin and X are correlated makes the conditional entropy of the bin given X (i.e. H(bin|X)) lower. The following relationship is well-known in information theory:

$$H(bin|X) < H(bin)$$

It means that the conditional entropy of bin knowing X is lower than the entropy of bin if bin and X are statistically correlated. The contextual information X is thus used to obtain the probability of bin being '0' or '1'. Given these conditional probabilities, the regular decoding engine (14) of FIG. 1 performs the arithmetic decoding of the binary value bin. The value of bin is then used to update the value of the conditional probabilities associated with the current bin, knowing the current contextual information X. This is called the context model updating step on FIG. 1. Updating the context model for each bin as long as the bins are being decoded (or coded), allows progressively refining the context modeling for each binary element. Thus, the CABAC decoder progressively learns the statistical behavior of each bin encoded in regular mode.

The regular arithmetic decoding of the current bin or its bypass decoding, depending on how it was coded, leads to a series of decoded bins.

The second phase of the CABAC decoding, shown on right side of FIG. 1, then comprises converting this series of binary symbols into higher level syntax elements. A syntax element may take the form of a flag, in which case it directly takes the value of the current decoded bins. On the other hand, if the binarization of the current syntax element corresponds to a set of several bins according to the considered standard specification, a conversion module, called "Binary Codeword to Syntax Element" (16) on FIG. 1, takes place.

This proceeds the reciprocal of the binarization step that was done by the encoder. The inverse conversion performed here thus comprises obtaining the value of these syntax elements based on their respective decoded binarized versions.

Figure 2:
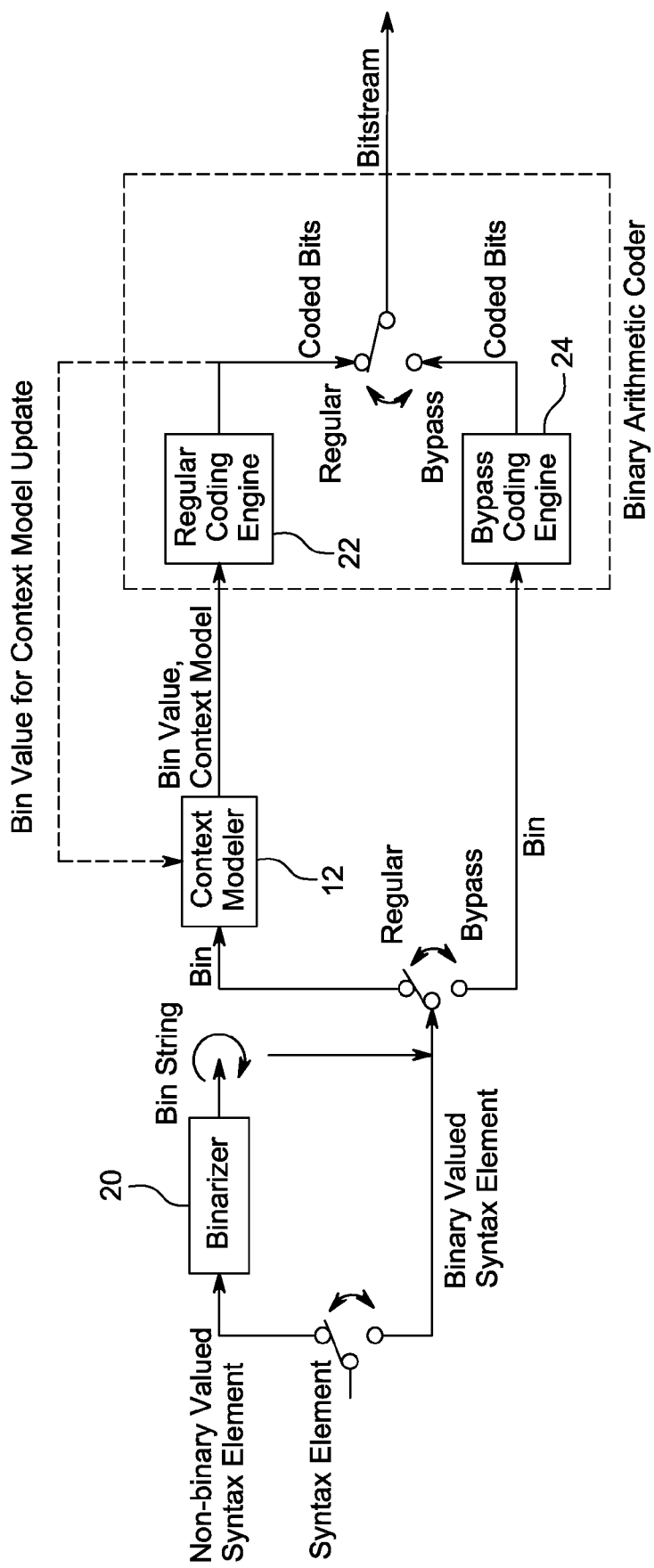
FIG. 2 depicts a CABAC (Context Adaptive Binary Arithmetic Coding) encoding process of a syntax element in bitstream.

FIG. 2 depicts the CABAC encoding process of a syntax element into a bitstream. This is the reciprocal process of the syntax element decoding process of FIG. 1. Note that the context modelling and the context model updating (12) are identical operations on the encoder and on the decoder sides. The encoding process further comprises a binarizer (20), a regular encoding engine (22) and a bypass coding engine (24). The binarizer (20) comprises obtaining binarized versions of the value of the syntax element.

Contexts Used in the Entropy Encoding of Transform Coefficients

First, a transform block is divided into 4×4 sub-blocks of quantized coefficients called Coding Groups (CG). The entropy encoding/decoding is made of several scanning passes, which scan the TB (Transform Block) according to a scan pattern selected among several possible scan patterns as illustrated on FIG. 3.

Figure 3:
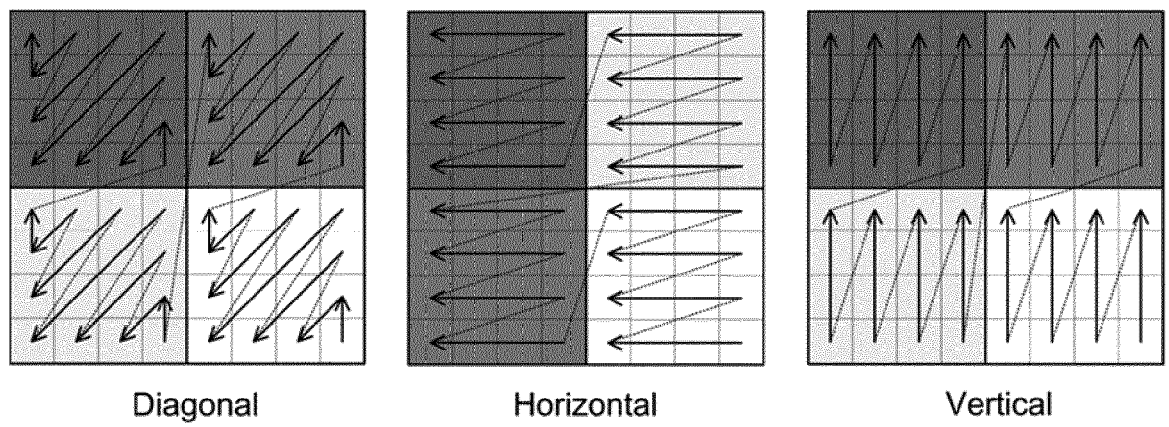
FIG. 3 illustrates different scanning orders in an 8×8 transform block as supported by HEVC.

As an example, the coding groups (CGs) contained in an 8×8 TB are illustrated on FIG. 3.

Transform coefficient encoding in HEVC involve five main steps: scanning, last significant coefficient encoding, significance map encoding, coefficient level encoding and sign data encoding.

For inter blocks, the diagonal scanning on the left of FIG. 3 is used, while for 4×4 and 8×8 intra blocks, the scanning order depends on the Intra Prediction mode active for those blocks.

A scan pass over a TB then comprises processing each CG sequentially according to one of the three scan patterns (diagonal, horizontal, vertical), and the 16 coefficients inside each CG are scanned according to the considered scanning order as well. A scanning pass starts at the last significant coefficient in the TB and processes all coefficients until the DC coefficient.

The entropy encoding of transform coefficients comprises up to five scan passes, respectively dedicated to the encoding of each syntax element in the following list:
  significant-coeff-flag: the significance of a coefficient indicates if the coefficient is zero or non-zero.
  coeff-abs-level-greater1-flag: indicates if the absolute value of a coefficient level is greater than 1.
  coeff-abs-level-greater2-flag: indicates if the absolute value of a coefficient level is greater than 2
  coeff-sign-flag: sign of a significant coefficient (0: positive, 1: negative).
  coeff-abs-level-remaining: the remaining value for the absolute value of a coefficient level (if the value is larger than the value coded in previous passes).

Once, on the decoder side, a coefficient's absolute value is known by performing a subset of the four first scan passes above, then no further syntax element is decoded in the remaining passes for that coefficient, with regards to its absolute value. Similarly, the coeff-sign-flag is signaled, hence decoded, only for coefficients which the decoder knows, based on the significance pass, it is not equal to zero.

All scan passes are performed by the encoder for a given CG until all the quantized coefficients in that CG can be reconstructed by a corresponding decoding process, before going to next CG.

A scan pass is a loop over all quantized coefficients in a given CG, in scanning order. The overall TB parsing process is made of the following steps:
  1. Decode the Last Significant Coordinate. This includes the following syntax elements:
    last_sig_coeff_x_prefix, last_sig_coeff_y_prefix, last_sig_coeff_x_suffix, and last_sig_coeff_y_suffix
    This provides the decoder with the spatial position (x- and y-coordinates) of the last non-zero coefficients in the whole TB.

Then for each successive CG from the CG containing the last significant coefficient in the TB to the top-left CG in the TB, the following steps apply:
  2. Decode the CG significance flag, which is called coded_sub_block_flag in the HEVC specification.
  3. Decode the significant coefficient flag for each coefficient in the considered CG. This corresponds to the syntax element sig_coeff_flag in the HEVC spec. This indicates which coefficients is non-zero in the CG.

Next parsing stages aim at signaling the coefficient level, for coefficient known as non-zero in the considered CG. This involves the following syntax elements.
  4. coeff_abs_level_greater1_flag: this flag indicates if current coefficient's absolute value is higher than 1 or not. If not, the absolute value if equal to 1.
  5. coeff_abs_level_greater2_flag: this flag indicates if current coefficient's absolute value is higher than 1 or not. If not, the absolute value if equal to 2.
  6. coeff_sign_flag: this flag indicates the sign of the non-zero coefficients coeff_abs_level_remaining encodes the absolute value of the coefficient higher than 2 in absolute value.

Encoding of the Significant Flag

Figure 4:
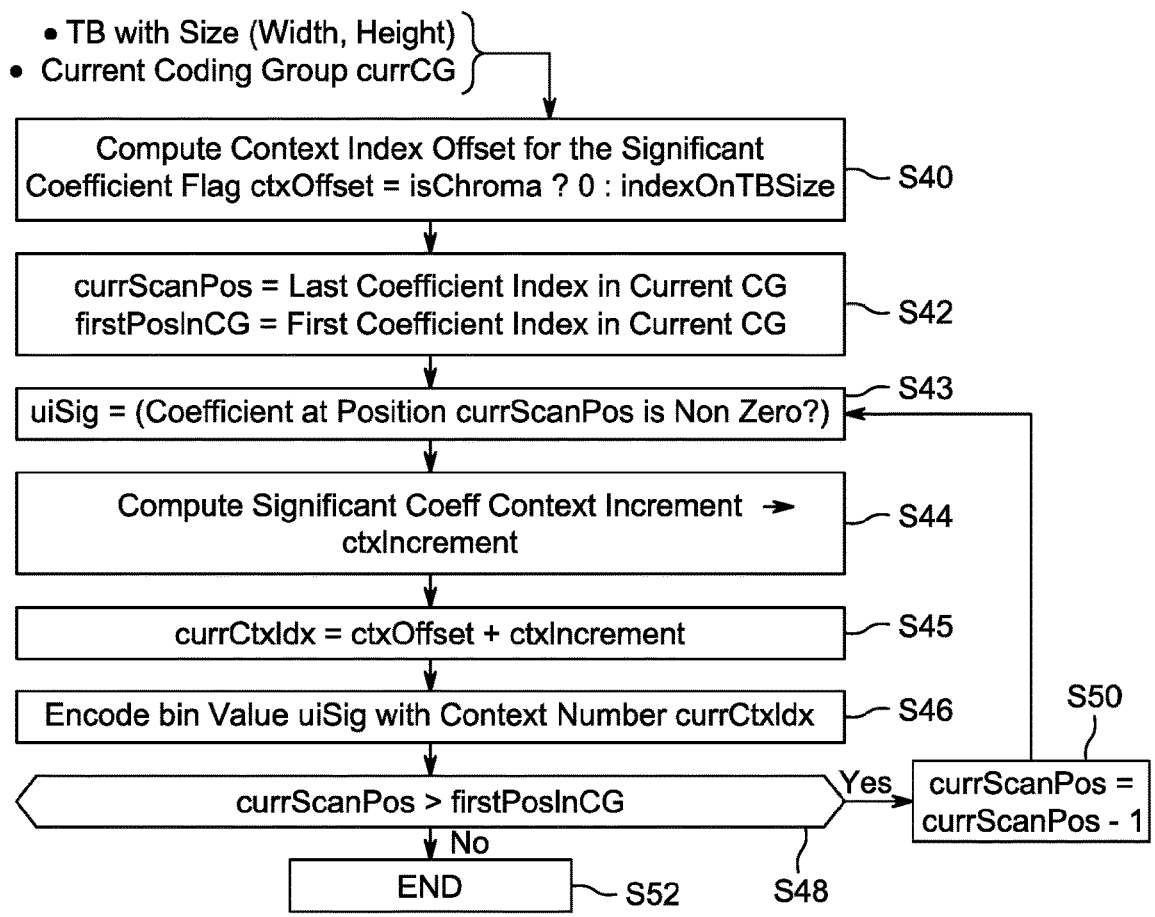
FIG. 4 depicts a flowchart of a method for coding a significance coefficient flag.

FIG. 4 depicts the significant coefficient encoding process.

The inputs to the process are the transform block (TB) to encode and the current Encoding Group currCG in the considered TB. The size of the TB is defined by (width, height). The first step (S40) of the process aim at computing the index of the base context index used to encode the significant coefficient flag. More precisely, ctxOffset is computed at S40. As shown on FIG. 4, it depends on the TB size, more precisely, on the TB area. Indeed, the following value is calculated:

$$uiLog2BlkSize = (\log 2(width) + \log 2(height)) \gg 1$$

If the current TB is a Luma block, then the contexts that are used to encode the significant coefficient flag are determined as a function of this value uiLog2BlkSize.

$$indexOnTbSize = uiLog2BlkSize \leq 2 ? 0 : f(uiLog2BlkSize)$$

In an embodiment, f( ) is a defined function, e.g. in the form of a Look-Up Table and (a<b?i:j) means that if a<b, then the result is i and otherwise the result is j. As an example, $$f(uiLog2BlkSize) = \begin{cases} 18 & \text{if } (uiLog2BlkSize = 3) \\ 36 & \text{if } (uiLog2BlkSize \geq 4) \end{cases}$$

This means separated sets of CABAC contexts are employed to encode the significant coefficient flag of TB with different areas, i.e. different uiLog2BlkSize.

These different sets of contexts are represented by the context address ctxOffset in a global indexed set of contexts useful for the encoding of the significant coefficient flag. Next steps of the encoding process of FIG. 4 comprises a loop over each coefficient in the current encoding group of the current TB, from the last coefficient towards the lowest frequency coefficient.

This loop is initialized at step S42, which computes the starting coefficient position and firstPosInCG and the last coefficient position currScanPos in the considered coding group, according to the HEVC scanning of quantized coefficient in a given coding group, during the parsing process. At S43, the significant coefficient flag or significance (also, sig_coeff_flag) is determined as variable uiSig, which is 1 if the coefficient in the currScanPos is non-zero, and 0 otherwise.

Figure 5:
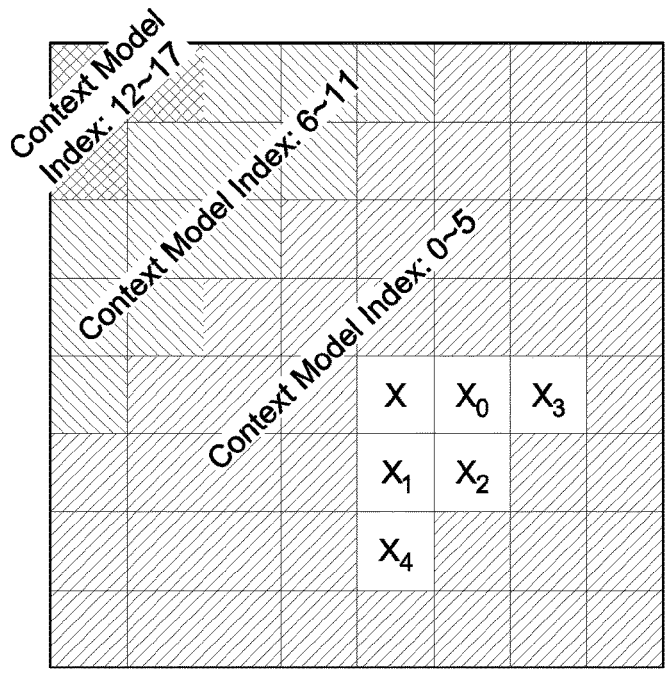
FIG. 5 illustrates the principles of template-based context model selection used to code a coefficient level, in particular a significant coefficient flag.

For each coefficient, a context index currCtxIdx for the coding of its significance is computed at step S45, as a function of the context offset (ctxOffset) and the context increment (ctxIncrement). It comprises calculating a context increment (S44) as described later with reference to FIG. 5.

Once the context index currCtxIdx for the current coefficient (defined by currScanPos) is obtained, its significance bin, represented by variable uiSig is entropy encoded (e.g., CABAC encoded) in step S46 based on the context identified by currCtxIdx. In step S48, the method checks whether currScanPos is larger than firstPosInCG. If the check in step S48 is true, the method decrements currScanPos by 1 in step S50 and returns to step S43. If the check in step S48 is false, the method ends in step S52.

The context increment computation (S44) of FIG. 4 depends on the values of the significant coefficient flag value of previously coded coefficients in the neighborhood covered by a local template. More specifically, the context index is determined based on the sum of the significant flags of neighboring coefficients. The template is depicted in white (X0 to X4) on FIG. 5. To capture the characteristics of transform coefficients at different frequencies, one TB is split into up to three regions and the splitting method is fixed regardless of the TB size, as illustrated on FIG. 5. Each TB is split into three regions marked with different grey levels, and the context indices assigned to each region are shown. For example, the first region (top-left part of the TB) is assigned the context indices 12 to 17.

The context increment ctxIncrement associated with a given transform coefficient X is computed as follows:

The number of significant coefficients in the set of neighboring coefficients ($x_0, \ldots, x_4$) is computed: $num_{SIG} = \Sigma_{i=0}^{4} sig(x_i)$ where $sig(x_i)$ is the significance of coefficient $x_i$ The index of the diagonal to which coefficient X belongs is computed as the sum of its coordinates:

$$diag = posX(X) + poxY(X)$$

Finally, the context increment for current coefficient X is computed as follows:

$$ctxIncrement = (diag<2?6:0) + (diag<5?6:0) + num_{SIG}$$

Luma and Chroma components are treated in a similar way but with separate sets of context models.

A context index for the encoding of the significance of the coefficient is computed (S45) by adding the context increment ctxIncrement to the context offset ctxOffset. Once the context index currCtxIdx of the current coefficient is obtained, its significance bin, represented by variable uiSig is arithmetically encoded. The process is over once the loop has processed the coefficient with lowest frequency in the current CG (S48, S50). When the coefficient with lowest frequency in the considered CG has been processed, the process ends (S52).

Encoding of the Splitting Information

Figure 6:
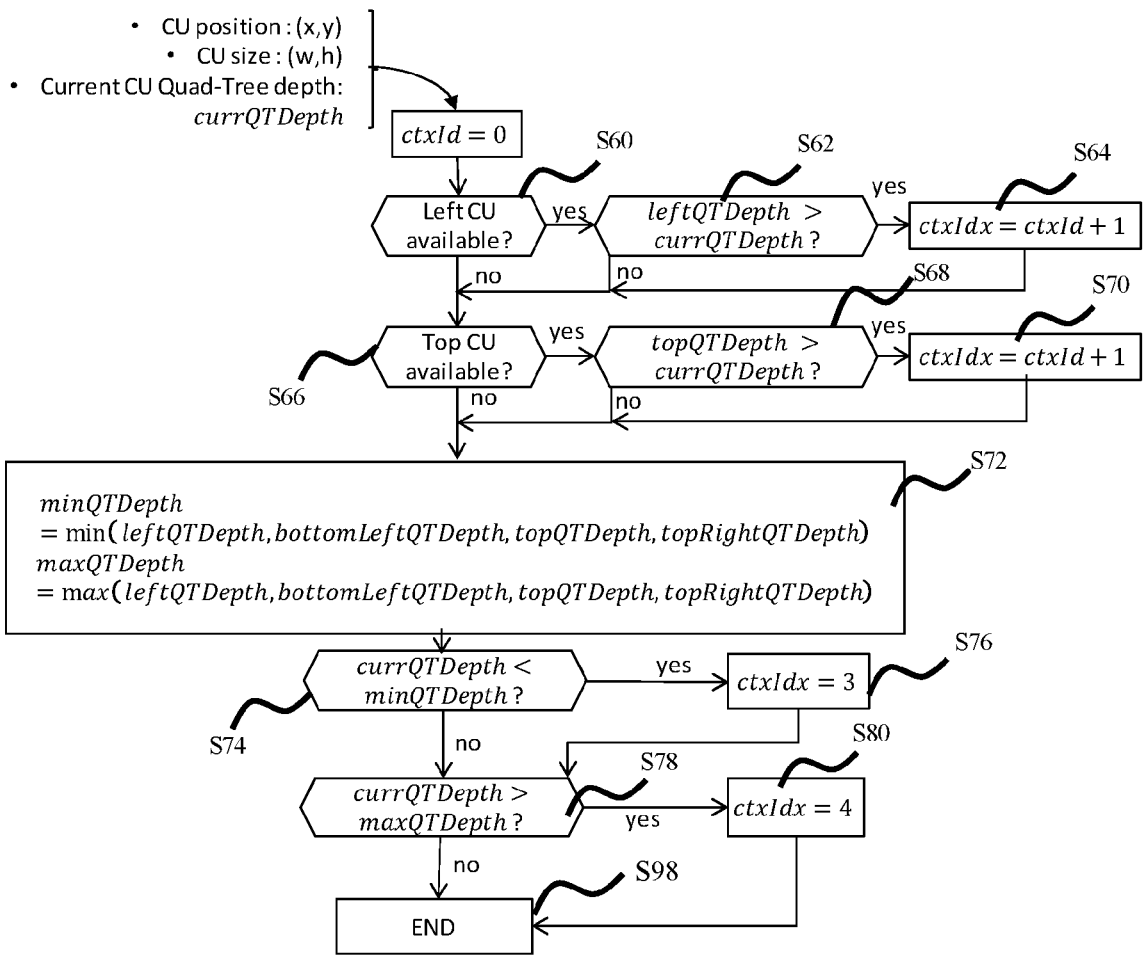
FIG. 6 depicts a flowchart of a method of context computation for the coding of a coding unit's quad-tree split flag.

FIG. 6 depicts the context computation for the encoding of a Coding Unit (CU) quad-tree split flag process.

Figure 7:
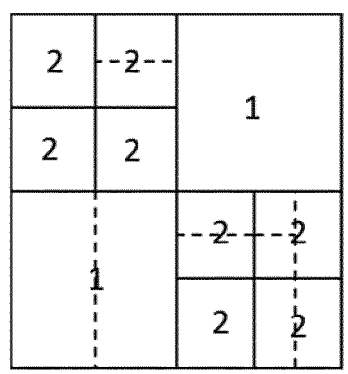
FIG. 7 depicts a coding tree and the quad-tree depth of each coding unit in the coding tree.

The syntax elements used to encode/decode the splitting information in a coding tree are the following ones:

The quad-tree split flag indicates if a CU is split in a quad-tree fashion or not. For example, the context used for the encoding of the quad-tree split flag is determined according to the value of the current CU's quad-tree depth, relative of the quad-tree depths of already coded surrounding CUs. A context is selected among 5 possible contexts to encode/parse the quad-tree CU split flag. The computation of the context identifier to encode the CU quad-tree split flag is depicted by the algorithm of FIG. 6. As can be seen, the context is determined according to the quad-tree depth of the current CU, relative to the quad-tree depth of already coded/parsed surrounding CUs. The quad-tree depth of a CU represents the depth level of the quad-tree part in the progressive splitting of a CTU into smaller Coding Units. On FIG. 7, an exemplary CTU divided into coding units is illustrated. The quad-tree depth of each coding unit is also given. This quad-tree depth depends on the number of quad-tree split that led to the considered CU. The Binary or Ternary splits are not included in the computation of the quad-tree depth.

The quantities represented on the diagram of FIG. 6 are defined as follows:

ctxIdx represents the index of the context that is being determined. It is computed by the algorithm of FIG. 6, and the associated context is used in the encoding of the CU quad-tree split flag.

leftQTDepth represents the quad-tree depth of the CU located on the left of the top-left corner of the current CU.

topQTDepth represents the quad-tree depth of the CU located on the top of the top-left corner of the current CU.

bottomLeftQTDepth represents the quad-tree depth of the CU located on the left of the bottom-left corner of the current CU.

topRightQTDepth represents the quad-tree depth of the CU located on the top of the top-right corner of the current CU.

currQTDepth is the quad-tree depth of the current CU.

The binary/ternary split flag indicates if a CU, which is not split in a quad-tree way, is split in a binary or ternary fashion, or not. If not, the CU is not split at all. The flag is called BT split flag in the following. To encode or parse it, a CABAC context among 3 possible contexts is used. The context id is computed according to the combined quad-tree and binary tree depth, relative to the combined depth of the left and top neighboring CU or current CU.

The orientation of the binary/ternary split mode. This orientation (horizontal or vertical) is signaled through a flag. It is context-based coded/parsed. The corresponding context takes value 0, 1 or 2, depending on the shape of the block. It is computed as follows:

btSplitOrientationContextIdx=(width==height)?0:
  (width>height?1:2)

The ternary split mode flag indicates if ternary split mode is used for current CU. It is context-based coded/parsed. A context among 6 possible contexts is used depending on the orientation of the split and on the shape of the block.

Back to FIG. 6, ctxId is initialized to zero. In the case where a left CU (i.e. a CU located on the left of the top-left corner of current CU) is available (S60), leftQTDepth is compared with currQTDepth (S62). In the case where leftQTDepth>currQTDepth, ctxIdx is set equal to ctxId+1 (S64) and the method continues to S66. Otherwise (i.e. a left CU is not available or leftQTDepth≤currQTDepth), the method continues to S66. In the case where a top CU (i.e. a CU located on the top of the top-left corner of current CU) is available (S66), topQTDepth is compared with currQT-Depth (S68). In the case where topQTDepth>currQTDepth, ctxIdx is set equal to ctxId+1 (S70) and the method continues to S72. Otherwise (i.e. a top CU is not available or leftQTDepth≤currQTDepth), the method continues to S72. minQTDepth is set equal (S72) to the smallest value between: leftQTDepth, topQTDepth, bottomLeftQTDepth, topRightQTDepth. maxQTDepth is set equal (S72) to the largest value between: leftQTDepth, topQTDepth, bottomLeftQTDepth, topRightQTDepth. In the case where currQTDepth<minQTDepth, ctxIdx is set to 3 (S74, S76) and the method continues to S78. Otherwise, the method continues to S78. In the case where currQTDepth>maxQTDepth, ctxIdx is set to 4 (S80) and the methods ends (S98). Otherwise, the method ends.

First Embodiment: Separating the Contexts by QP Value to Encode the Transform Coefficient of a Residual Block According to a first embodiment, the contexts used to encode the transform coefficients are separated according to the QP value.

In other words, two CUs that have different QP values are encoded and decoded with different sets of contexts, with regards to the transform coefficients.

According to a variant, separate sets of contexts are used only if the respective QP values are sufficiently different, i.e. the absolute difference between the 2 QP values is higher than a given value.

According to a variant, a limited number of separated sets of contexts is used, to limit to overall number of contexts used for encoding and decoding a residual block. In this case, one set of contexts is defined per QP range. The syntax elements of a CU are encoded using the context set associated with the QP range which the CU's QP belongs to. In an example, at most 3 different QP-based sets of contexts may be used.

In practice, the determination of the identifier of a context used to encoded a given coefficient significant flag would be similar to the method described in section entitled "encoding of the significant flag". The difference is that the context id is also differentiated according to the QP value of the considered CU.

For instance, in the prior art, the quantity ctxIncrement is computed as described in section entitled "encoding of the significant flag". Here, let us assume that 3 separated sets of contexts are used based on the QP value.

In that case, the final context increment value used to encode the considered significance flag typically becomes:

$$contextIncrementFinal = NctxIncrement \times QPSetIdx + ctxIncrement \quad (Eq. 1)$$

Where:

NctxIncreement is the number of possible values for ctxIncrement (5 here).

QPSetIdx is the index of QP-based set of contexts. If at most 3 sets of separated contexts are used, then QPSetIdx is equal to 0, 1 or 2.

According to an embodiment, the proposed QP-based context separation is only employed in the encoding and parsing of the lastSignificantX and lastSignificantY syntax elements.

Figure 8:
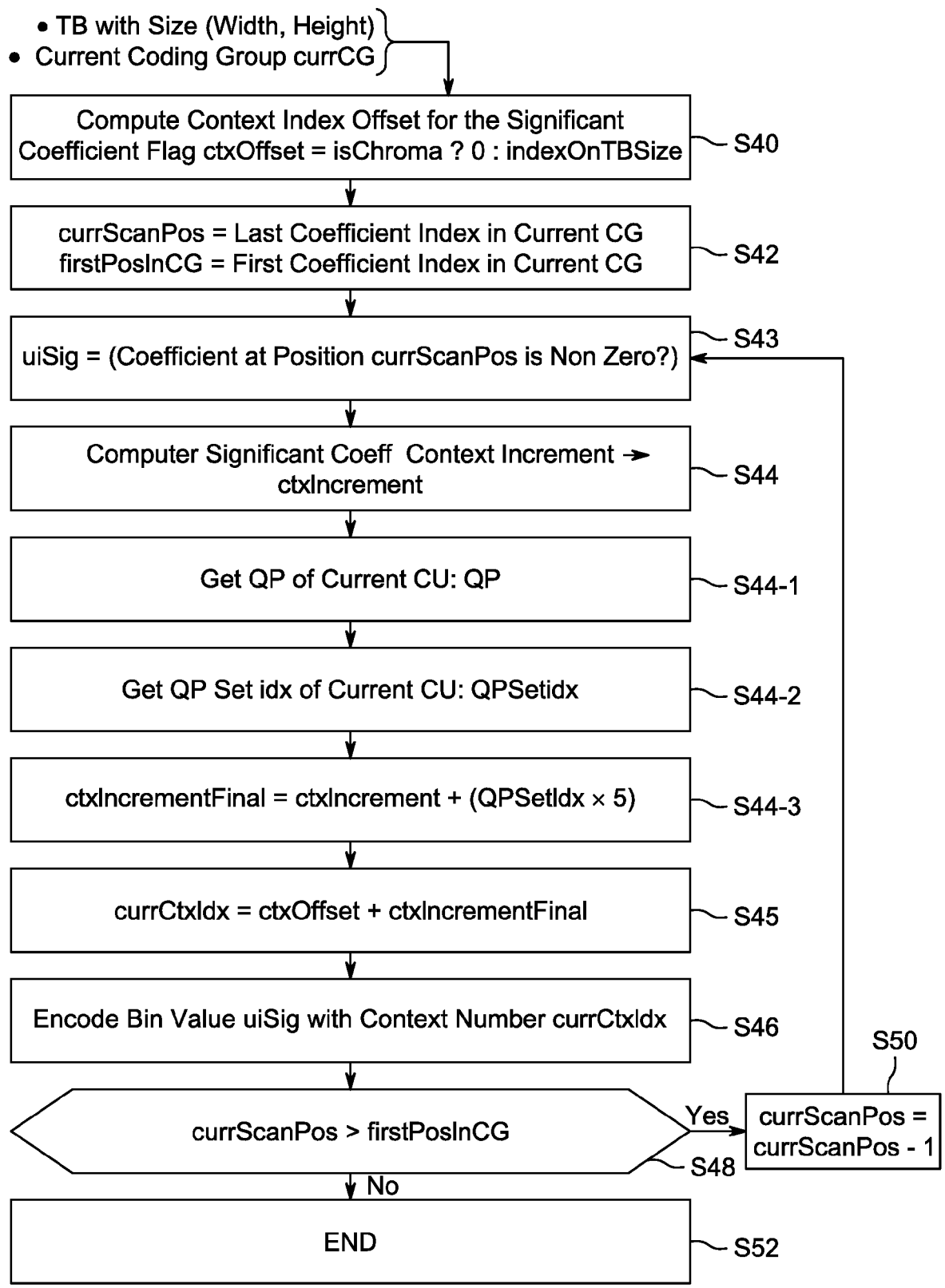
FIG. 8 depicts a flowchart of a method for coding a significance coefficient flag using context separation based on coding unit's QP.

The first embodiment described in this section can be applied on each of the following syntax elements, which employs context-based binary arithmetic encoding:

last_sig_coeff_x_prefix, last_sig_coeff_y_prefix
coded_sub_block_flag
coeff_abs_level_greater1_flag
coeff_abs_level_greater2_flag The first embodiment is illustrated on FIG. 8. The steps of FIG. 8 identical to the steps of FIG. 4 are identified with the same numerical references and are not further disclosed. FIG. 8 comprises additional steps which aim at computing the final context index increment ctxIncrementFinal used to obtain the CABAC context actually used to encode the significant flag of a quantized coefficient, according to the proposed first embodiment. the final context index increment is obtained by getting the QP of current CU (S44-1), getting the QP range index QPSetIdx from the QP of current CU (S44-2), and then computing (S44-3) the final context index increment according to the equation (Eq. 1). At S45, the final context index increment ctxIncrementFinal is added to ctxOffset to obtain currCtxIdx.

Second Embodiment: Separating the Contexts by QP Values to Encode the CU Split Information According to a second embodiment, the flags indicating the CU partitioning are coded/parsed with contexts selected based on the QP value of the considered coding Unit. This means that two CUs with different QP values employ a separate set of contexts for the CABAC encoding of their associated split flags.

According to a variant, separate sets of contexts are used only if the respective QP values are sufficiently different, i.e. the absolute difference between the 2 QP values is higher than a given value.

According to a variant, a limited number of separated sets of contexts is used, to limit to overall number of context used for the encoding and decoding a residual block.

Figure 9:
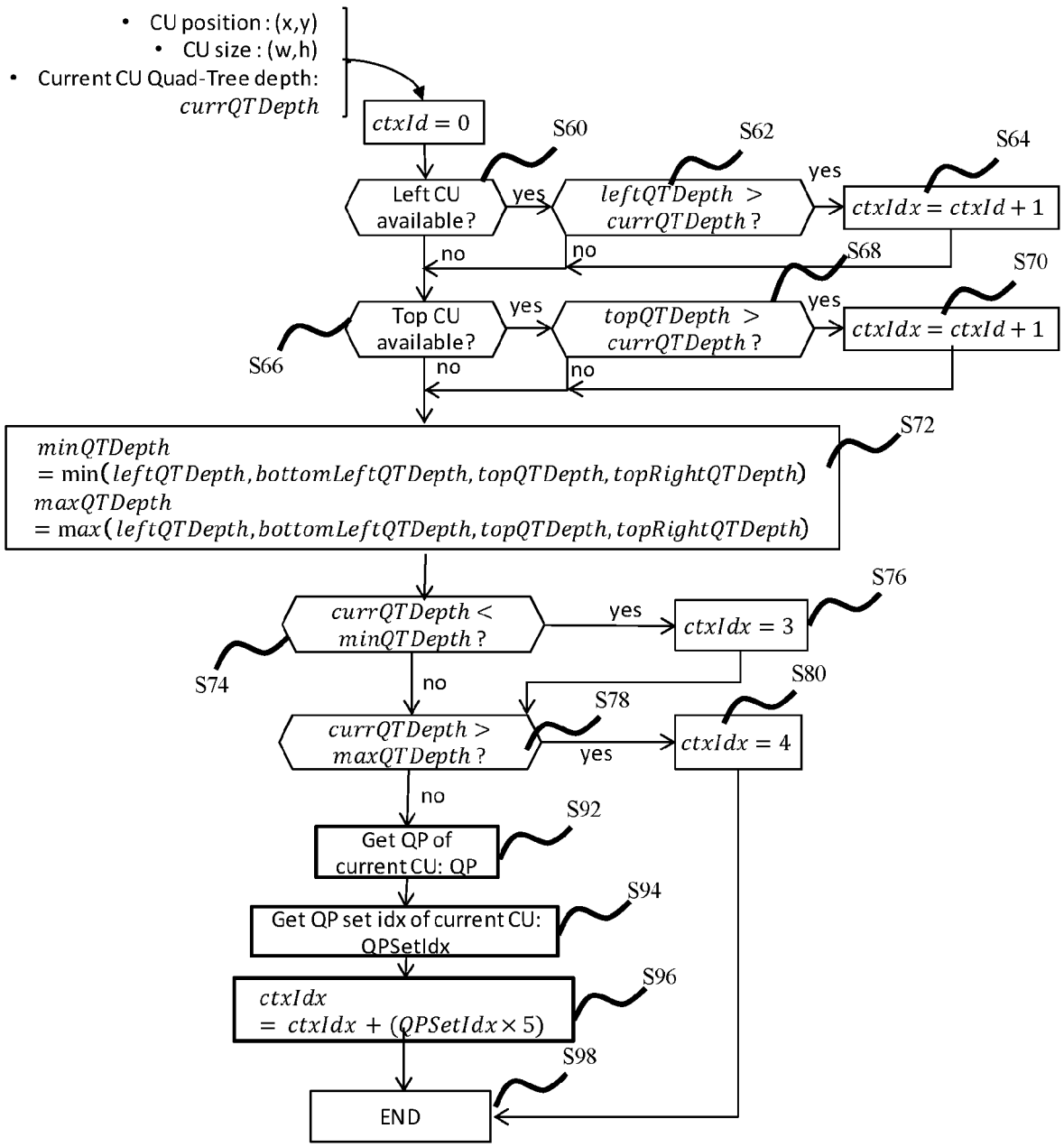
FIGS. 9 and 10 depicts a flowchart of a method of context computation for the coding of a coding unit's quad-tree split flag according to various embodiments.

The embodiment introduced in this section is illustrated by FIG. 9. The steps (S60 to S80) of FIG. 9 identical to the steps of FIG. 6 are identified with the same numerical references and are not further described. The steps of the process of FIG. 9 that are specific to this embodiment are the three last steps of the flowchart, i.e. S92, S94 and S96.

At S92, the QP of the current CU, named current QP, is obtained. Next, at S94, the set of QP values the current QP belongs to is computed. Indeed, a limited number of sets of QP values is considered. This leads to a limited increase in the number of CABAC contexts when separating the contexts on a QP basis. The computation of the set of QP index, noted QPSetIdx, may take the following form:

$$QPSetIdx = floor(max(min((QP-30)/4+2,4),0))$$

where: max(a, b) returns a if a>=b and b otherwise; min(a,b) returns a if a<=b and b otherwise; and floor(a) returns the largest integer less than or equal to x.

Note that in this particular implementation in which 5 sets of QP values are used. Reducing to 3 sets of QP ranges can be achieved by using the following modified formula:

$$QPSetIdx = floor(max(min((QP-30)/5+2,2),0))$$

In particular, the step (S96) that transforms the context identifier is as follows:

ctxIdx=ctxIdx+(QPSetIdx×5)

It aims at separating the contexts. In the prior art, 5 possible contexts (indexed from 0 to 4) are used to select the context to encode the CU quad-tree split flag. Now according to the above context id transformation, the final context id takes its value in an overall set of 3×5=15 possible values in the case where three ranges of QP are used to separate the contexts. In other words, the computation of the context id of the prior art is kept, but the so-computed context id is used to select a context in a set of contexts that is indexed by the QPSetIdx value. The QPSetIdx value is an index that results from the QP value of the current CU, more precisely the QP range which the current QP value belongs to. As an example, if 3 sets of separated contexts are used, QPSetIdx is equal to 0, 1 or 2.

The second embodiment described in this section can be applied with the following syntax elements.

The quad-tree split flag
The binary/ternary split flag
The binary/ternary split orientation flag
The ternary split mode flag Third Embodiment: Updating the Context Probabilities as a Function of the QP Values of Successive Coding Units According to another embodiment, the updating of the probabilities associated with a given context only takes place in the case where the contextual information used for the CABAC encoding in the current CU comes from one or several neighboring CUs with the same QP value as the QP value of the current CU or a QP value close to the QP value of the current CU. By close to the current QP, one typically means that the absolute difference between the two QPs is below a given value. If this is not the case, i.e. if the distance between the two QPs is too high, then context probability updating step is bypassed.

In one embodiment, if no neighboring CU of the current CU has the same QP (or a close QP) as the current CU, then the bypass mode is chosen to encode and parse the current CU's quad-tree split flag.

If at least one neighboring CU has the same QP (or a close QP) as the current CU, then only the neighboring CUs with same QP (or with a close QP) as the current CU are considered to compute the CABAC context of the quad-tree split flag of the current CU. Indeed, in CABAC the context probabilities represent conditional probability of a binary symbol (or bin) being equal to 1 (resp. 0) given some contextual information available both at the encoder and decoder side, at the time the considered bin is being encoded or parsed.

The statistical dependency of the bin value on the contextual information used in the CABAC engine is even more important since the current CU and its causal neighboring CUs are coded with the same QP, or with close QPs.

Therefore, bypassing the context model updating in the case of sufficiently different QP values is advantageous, because it avoids degrading the accuracy of the CABAC context modelling.

According to an embodiment, the third embodiment described in this section is employed in combination with the first embodiment and/or the second embodiment.

According to another embodiment, the third embodiment described in this section is employed without using the first and the second embodiments.

Fourth Embodiment: Employing Context-Based Encoding According to the QP Value of the Current CU Relative to Neighboring CUs According to a fourth embodiment, the context-based encoding of a binary symbol (used either in the transform coefficients or in split information encoding) is used if the considered bin and the contextual information used for its encoding/parsing belong to coding units with the same QP values (or close QP values).

Otherwise, the considered binary symbol is coded in the known bypass mode of the entropy coder, which comprises encoding the binary symbol over one bit. This means in such case the considered bin is not arithmetically encoded. Instead, a bit equal to the binary symbol (or equal to its complementary value) is written directly to the coded bitstream.

Figure 10:
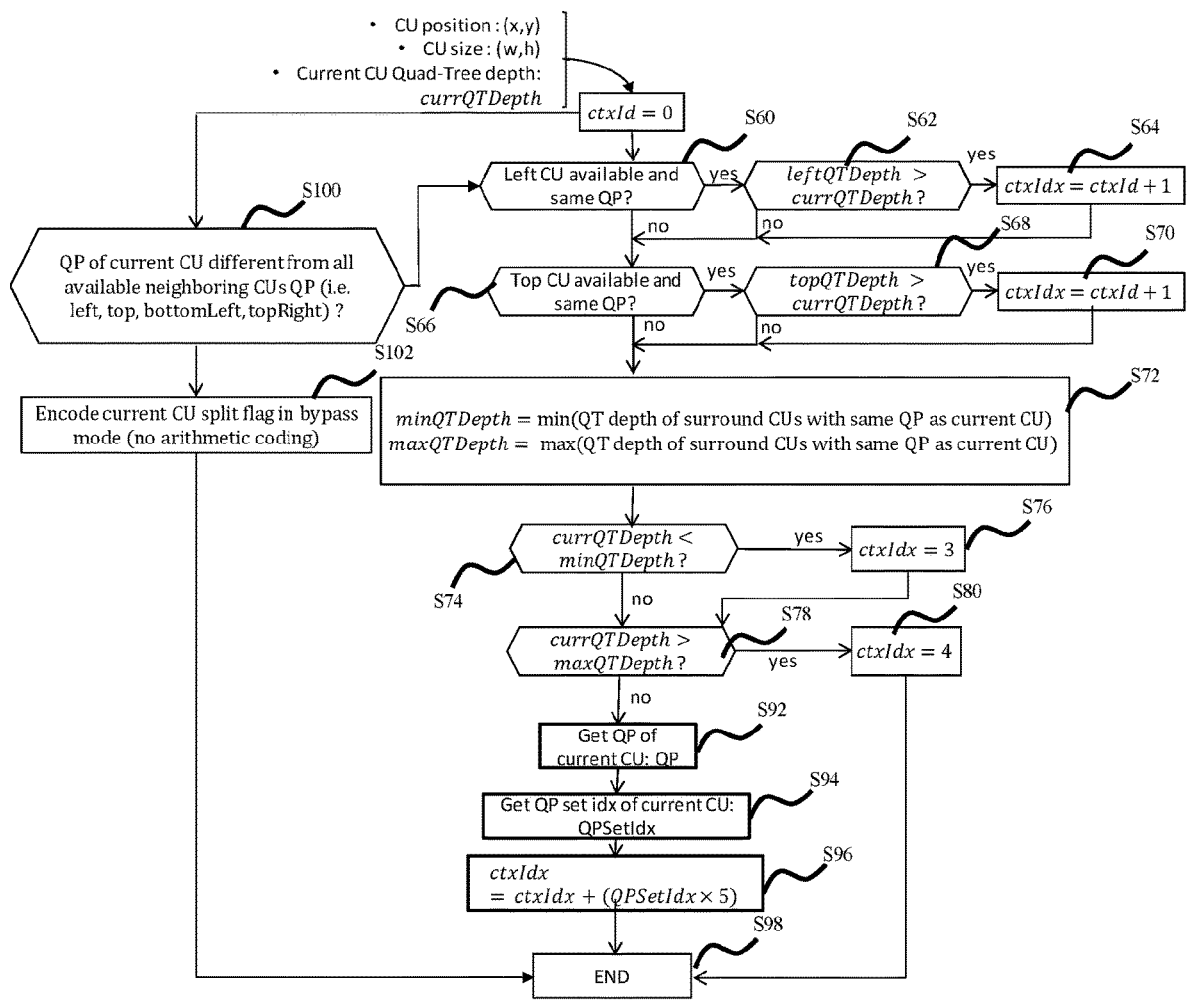

This embodiment is illustrated by the diagram of FIG. 10. The modules (S60 to S80) of FIG. 10 identical to the modules of FIG. 6 are identified with the same numerical references and are not further described. S60, S66 and S72 are slightly modified. In the case where a left CU is available (S60) and has a same QP as current QP (or a QP close to QP of current CU), leftQTDepth is compared with currQTDepth (S62). In the case where a top CU is available (S66) and has a same QP as current QP (or a QP close to QP of current CU), topQTDepth is compared with currQTDepth (S68). In S72, minQTDepth and maxQTDepth are computed as follows:

minQTDepth=min($QT$ depth of surround $CUs$ with same (or close to) $QP$ as current $CU$)

maxQTDepth=max($QT$ depth of surround $CUs$ with same (or close to) $QP$ as current $CU$)

In the case where, no neighboring CU of the current CU has the same QP (or a close QP) as the current CU, then the bypass mode is chosen to encode and parse the current CU's quad-tree split flag (S100).

In the case where at least one CU neighboring the current CU has the same QP (or a close QP) as the current CU, then only the neighboring CUs with same QP (or with a close QP) as the current CU are considered to compute the CABAC context of the quad-tree split flag of the current CU (S102).

Finally, the first embodiment previously introduced in section entitled "separating the contexts by QP value to encode the transform coefficient of a residual block", previously described with reference to FIG. 8, is also included in the process of FIG. 9 (S92, S94 and S96) in order to separate the contexts between CUs having different QPs, or belonging to different set of QP values. Note these context separation steps are optional and may be discarded from the process of FIG. 9.

This document describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 11:
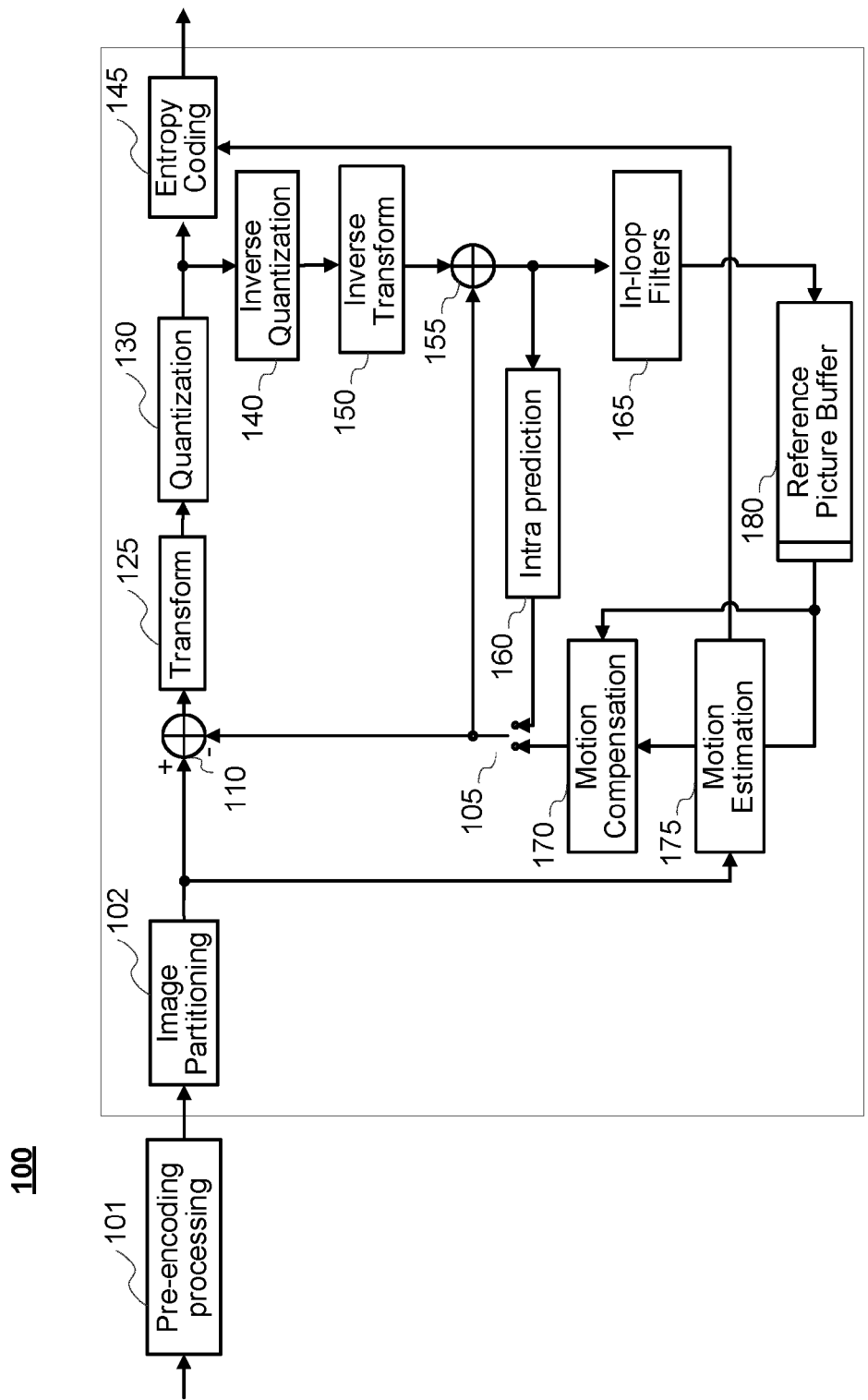
FIG. 11 illustrates a block diagram of a video encoder according to an embodiment.
Figure 12:
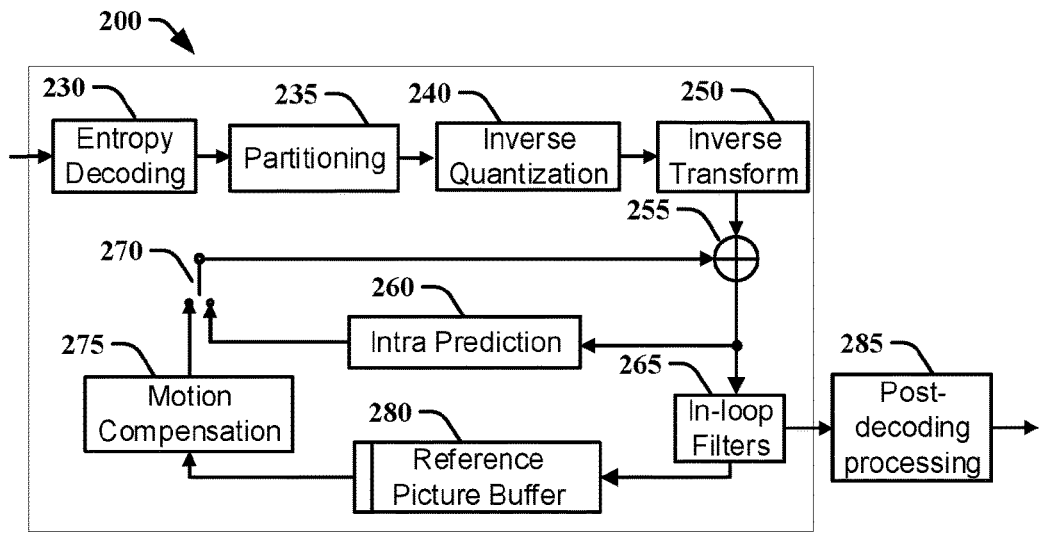
FIG. 12 illustrates a block diagram of a video decoder according to an embodiment.
Figure 13:
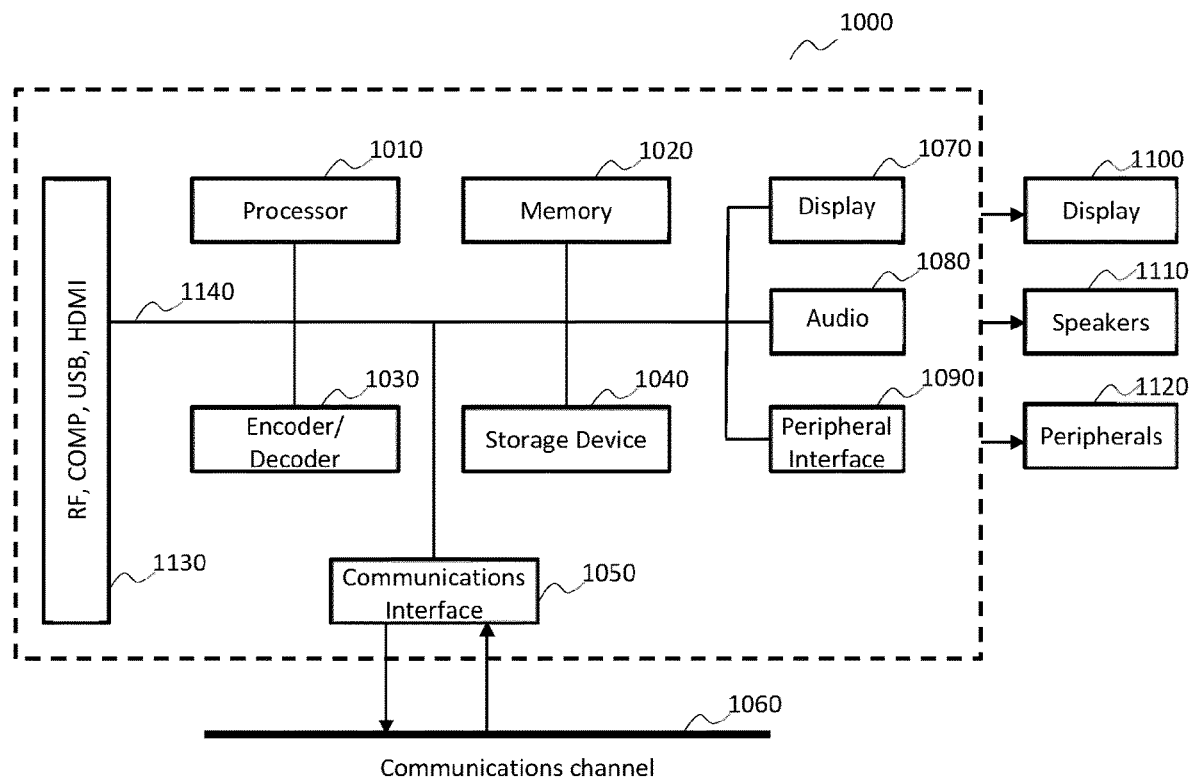
FIG. 13 illustrates a block diagram of an example of a system in which various aspects and embodiments are implemented.

The aspects described and contemplated in this document can be implemented in many different forms. FIGS. 11, 12 and 13 below provide some embodiments, but other embodiments are contemplated and the discussion of FIGS. 11, 12 and 13 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the entropy encoding, and/or decoding modules (145, 230), of a video encoder 100 and decoder 200 as shown in FIGS. 11 and 12. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example, The number of different QP-based sets of contexts. The specific values are for example purposes and the aspects described are not limited to these specific values.

FIG. 11 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 12 illustrates a block diagram of a video decoder 200. In the decoder 200, a bitstream is decoded by the decoder elements as described below. Video decoder 200 generally performs a decoding pass reciprocal to the encoding pass as described in FIG. 11. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 13 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device).

System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video encoding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs. The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, entropy encoding a block responsive to a quantization parameter associated with the block.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, entropy encoding a block responsive to a quantization parameter associated with the block.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, entropy encoding a block responsive to a quantization parameter associated with the block, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

During the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or encoding parameters values, with a complete evaluation of their encoding cost and related distortion of the reconstructed signal after encoding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the encoding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example—a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for quantization based entropy encoding. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We have described a number of embodiments. These embodiments provide, at least, for the following generalized inventions and claims, including all combinations, across various different claim categories and types:

A method comprising: entropy encoding a syntax element associated with a block (e.g. a CU, a TB, a picture block) responsive to a quantization parameter associated with said block.

A method comprising: context-based entropy encoding a syntax element associated with a block, the context for entropy encoding the block (e.g. a CU) being determined responsive to a quantization parameter associated with said block.

The probabilities of the entropy encoding are updated in the case where the quantization parameter associated with the block is close to at least one quantization parameter of one of its neighboring blocks (e.g. left or top neighbors) and not updated otherwise.

The probabilities of the entropy encoding are updated in the case where the quantization parameter associated with the block is close to all quantization parameters of its neighboring blocks (e.g. left or top neighbors) and not updated otherwise.

Two quantization parameters are close if their values are equal.

Two quantization parameters are close if the absolute difference between the two quantization parameter values is higher than a given value.

A limited number of separated sets of contexts is used.

The block is coded in bypass mode in the case where its quantization parameter and the quantization parameters of its neighboring blocks are not close, and are coded using contexts otherwise.

Entropy encoding is context-adaptive entropy encoding.

The syntax element associated with a block belongs to the set of syntax elements comprising; the significance flag of a coefficient of the block, flags indicating whether the absolute value of a coefficient level of the block is greater than one or two, the elements used to encode the position of the last significant coefficient (last non-zero coefficient) in the block, the split flags (e.g. binary tree split flag, ternary tree split flag, etc).

A bitstream or signal that includes one or more of the described syntax elements, or variations thereof Creating and/or transmitting and/or receiving and/or decoding a bitstream or signal that includes one or more of the described syntax elements, or variations thereof A TV, set-top box, cell phone, tablet, or other electronic device that performs entropy encoding based on quantization parameter according to any of the embodiments described.

A TV, set-top box, cell phone, tablet, or other electronic device that performs entropy encoding based on quantization parameter according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs entropy encoding based on quantization parameter according to any of the embodiments described.

A TV, set-top box, cell phone, tablet, or other electronic device that receives (e.g. using an antenna) a signal over the air that includes an encoded image, and performs entropy encoding based on quantization parameter according to any of the embodiments described.

Various other generalized, as well as particularized, inventions and claims are also supported and contemplated throughout this disclosure.

The invention claimed is:

1. A method comprising:
obtaining a data set representing a current block of a picture; and
decoding the data set, the decoding comprising:
obtaining a value representative of a current quantization applied to transform coefficients of the current block;
determining which at least one block level Context Adaptive Binary Arithmetic Coding (CABAC) context of a plurality of block level CABAC contexts adapted on previous blocks of the picture to apply on binary data of the data set for decoding a significance flag of a transform coefficient of the current block from the obtained data set based on a context increment value, the context increment value being determined from the value representative of the current quantization; and
CABAC decoding the significance flag with the at least one determined context.

2. The method of claim 1, further comprising updating probabilities of the CABAC decoding responsive to the value representative of the current quantization is close to a value representative of a quantization of at least one neighboring block of the current block and not updating probabilities otherwise.

3. The method of claim 1, further comprising updating probabilities of the CABAC decoding responsive to the value representative of the current quantization is close to values representative of quantizations of all the neighboring blocks of the current block and not updating probabilities otherwise.

4. The method of claim 1, wherein a CABAC is used for the current block responsive to the value representative of the current quantization is close to a value representative of a quantization of at least one neighboring block of the current block, and a bypass mode is used otherwise.

5. The method of claim 1, wherein the significance flag is a split flag.

6. A non-transitory computer readable medium comprising stored instructions that, when executed by at least one processor, cause the least one processor to perform the method of claim 1.

7. An apparatus comprising one or more processors configured to perform:
obtaining a current block of a picture; and
encoding the current block, the encoding comprising:
obtaining a value representative of a current quantization applied to transform coefficients of the current block;
determining which at least one block level CABAC context of a plurality of block level CABAC contexts adapted on previous blocks of the picture to apply on binary data representing a significance flag of a transform coefficient of the current block for encoding the significance flag in a data set representing the current block based on a context increment value, the context increment value being determined from the value representative of the current quantization; and
applying a CABAC encoding to the significance flag with the at least one determined context.

8. An apparatus comprising one or more processors configured to perform:
obtaining a data set representing a current block of a picture; and
decoding the data set, the decoding comprising:
obtaining a value representative of a current quantization applied to transform coefficients of the current block;
determining which at least one block level CABAC context of a plurality of block level CABAC contexts adapted on previous blocks of the picture to apply on binary data of the data set for decoding a significance flag of a transform coefficient of the current block from the data set based on a context increment value, the context increment value being determined from the value representative of the current quantization; and
applying a CABAC decoding to the significance flag with the at least one determined context.

9. The apparatus of claim 8, further comprising updating probabilities of the CABAC decoding responsive to the value representative of the current quantization is close to a value representative of a quantization of at least one neighboring block of the current block and not updating probabilities otherwise.

10. The apparatus of claim 8, further comprising updating probabilities of the CABAC decoding responsive to the value representative of the current quantization is close to values representative of quantizations of all the neighboring blocks of the current block and not updating probabilities otherwise.

11. The apparatus of claim 8, wherein a CABAC is used for the current block responsive to the value representative of the current quantization is close to a value of a quantization of at least one neighboring block of the current block, and a bypass mode is used otherwise.

12. A method comprising:
obtaining a current block of a picture; and
encoding the current block, the encoding comprising:
obtaining a value representative of a current quantization applied to transform coefficients of the current block;
determining which at least one block level CABAC context of a plurality of block level CABAC contexts adapted on previous blocks of the picture to apply on binary data representing a significance flag of a transform coefficient of the current block for encoding the significance flag in a data set representing the current block based on a context increment value, the context increment value being determined from the value representative of the current quantization; and
applying a CABAC encoding to the significance flag with the at least one determined context.

13. The method of claim 12, wherein the significance flag is a split flag.

14. The method of claim 12, wherein a CABAC is used for the current block responsive to the value representative of the current quantization is close to a value representative of a quantization of at least one neighboring block of the current block, and a bypass mode is used otherwise.

15. A non-transitory computer readable medium comprising stored instructions that, when executed by at least one processor, cause the least one processor to perform the method of claim 12.

* * * * *